United States Patent [19]

Gyökhegyi

[11] Patent Number: 4,702,801
[45] Date of Patent: Oct. 27, 1987

[54] PROCESS AND APPARATUS FOR THE DETERMINATION OF COLUMN TRAY EFFICIENCY

[76] Inventor: László Gyökhegyi, Mányoki ut 5, 1118 Budapest, Hungary

[21] Appl. No.: 472,801

[22] Filed: Mar. 7, 1983

[51] Int. Cl.$^4$ ............................................. B01D 3/42
[52] U.S. Cl. ..................................... 203/1; 203/2; 203/3; 203/49; 203/DIG. 2; 73/861.05; 73/861.07; 202/158; 202/160; 261/114.1; 422/130
[58] Field of Search ...................... 203/1, 2, 3, 49, 99, 203/DIG. 18, DIG. 2; 202/160, 158; 208/DIG. 1; 196/132; 261/114 R; 73/861.05–861.08; 422/111, 130, 139; 364/500; 55/220

[56] References Cited

U.S. PATENT DOCUMENTS

| | | | |
|---|---|---|---|
| 3,009,864 | 11/1961 | Webb | 203/3 |
| 3,111,460 | 11/1963 | Orr | 203/3 |
| 3,401,092 | 9/1968 | Matta | 203/2 |
| 4,167,870 | 9/1979 | Haas | 73/861.07 |
| 4,224,283 | 9/1980 | Potts | 422/111 |

OTHER PUBLICATIONS

J. H. Perry, Chemical Engineer' Handbook, 4th Edit., 1963, pp. 18–16.
Lashmet, P. K. et al., Process Des. Develop of Ind. Eng. Chem., vol. 13, 1974, #2, pp. 103–106.
Grassmann, P. Physikalishe Grundlagen der Chemie-Ingenieur-Technik, pp. 494–499.
Bakowski, Chemical Eng. Science, 1957, pp. 266–282.
Sommerville, Chemical Engineering, 1972, pp. 71–76.
Walter et al.: *Gas Absorption in Bubble-Cap Columns* Ind. Eng. Chem, 33, 1941, pp. 493–501.

*Primary Examiner*—Wilbur Bascomb
*Attorney, Agent, or Firm*—Gabriel P. Katona

[57] ABSTRACT

Process and apparatus for the preliminary determination of the efficiency of the trays of distillation and/or absorption columns in order to establish the actual tray number of the columns, as well as for those columns the tray number of which was determined thereby. Each column section of different geometry or load is loaded with a set of trays (12) with air water system consisting at least of two trays having identical geometry (13,13a) and one air distributor (14). On the basis of the recognition that each set of trays (12) may be regarded as a cascade consisting of mixers which include series-connected mixers formed from the trays (13,13a), the liquid content of which is mixed by ascending vapor, or gas, in this case by air. The residence time-spectrum of the water soluble non-volatile substance (tracer) admitted into water and conducted to the upper or intermediate tray of a set of trays (12) to be tested, is measured in such a way that on the basis of the measured residence time-spectrum the tray efficiency valid for air-water system and the tray number valid for the separating system of distillation and/or absorption columns can be calculated—instead of estimation—as a result of which overestimation of the exact tray number of the complete distillation and/or absorption units is no longer necessary.

19 Claims, 2 Drawing Figures

PROCESS AND APPARATUS FOR THE DETERMINATION OF COLUMN TRAY EFFICIENCY

The invention relates to a process and apparatus for a preliminary determination of the efficiency of the trays in distillation and/or absorption columns in order to establish the actual tray-number of said columns, and to the structure of the columns containing the number of trays which were determined by said process.

Until recently, the actual tray-number of the distillation and/or absorption columns necessary for the given separation had been determined in the industry by calculating first the so-called theoretical tray-number required for solving the problem, then in the knowledge of the vapour-, gas- and liquid stream obtained from the theoretical calculations, the trays were constructed. This was followed by estimation of the efficiency, and dividing the already known theoretical tray-number by the numerical value said estimated efficiency. By this procedure the actual tray-number of the column is received.

In order to increase the reliability of the efficiency estimation, generally three trays are made for each column section (e.g. stripping and rectifying section) of different diameter and load. Air is blown from underneath through the trays from an apparatus made for this purpose, and water is circulated from above.

The upper tray is used for the exact distribution of water and the lower tray for the air stream. In case of trays having large diameter, the use of an air distributor—instead of the lower tray—is less expensive. Said air distributor does not inhibit the downflow of the water against the ascending air. Consequently in this case only two trays have to be constructed and tested for each column section, in addition to the air distributor.

In the process of the hydraulic tests partly the minimum and maximum values of the air and water stream passing through the trays, and partly the flow resistance of the trays (so-called pressure drop occurring in the air stream) are measured.

In support of the efficiency estimation, functioning of the trays is observed visually as well. The subjective evaluation of these visual observations may result in correction of one or other structural dimension, while the proper functioning allows the assumption of higher efficiency. The estimated character of the efficiency naturally will not change, consequently it will lead to significant overestimation of the tray-number of the column even in case of firms well-experienced in this respect. This is the source of excessive investment cost.

Thus the construction of a column with trays serving for the purpose of separation by distillation and/or absorption begins with the special formulation of the problem, and has the following stages:

a. working out the theoretical bases of separation, ending with determination of the theoretical tray-number,
b. laboratory- and semi-operational checking,
c. design work including determination of the column diameter, tray distance and structural dimensions of the trays; possible adoption of tray designs previously developed for similar systems;
d. production of three or two trays characteristic to each column section and one distributor,
e. hydraulic testing of the trays mentioned in d.
f. estimation of the mean efficiency of the tested trays, possible modification of the tray construction,
g. determination of the actual tray-number of the column,
h. strength, etc, calculation of the column,
j. manufacture of the column,
k. erection, mounting, painting, insulation, framing of the supporting and auxiliary apparatuses of the column,
l. pressure tests, trial operation, putting into operation.

The subject of the present invention—as defined earlier—is a process and apparatus for carrying out the steps in points e. to g.

The purpose of the hydraulic tests is twofold:

1. Measuring the pressure drop caused by the designed vapour- or gas- and liquid streams, as well as the capacity limits with water-air system,
2. Visual observation of the functioning of the trays using the same stream types.

Measuring of the pressure drop represents no special problem. Results of the measurements conducted with air-water system give partly reliable information and partly the results can be recalculated for other mixtures as well. The same applies to the capacity limits determined with air-water system (F. J. Zuiderweg—D. van der Meer: Chemische Technik 24.1.1972. 10–14).

Checking the functioning of the tray is necessary, since the efficiency of the tray can not be exactly determined as yet. Because of the lack of a more scientific basis, the efficiency of the tray can be determined only by estimation (J. H. Perry: Chemical Engineer's handbook, McGraw-Hill Book Co., New York, Toronto, London, 1963. 4th Edition, 18-16). Checking the functioning of the trays with air-water system is aimed at increased accuracy of the estimation. Such checking apparatus is kept by nearly all the known chemical firms. Detailed description is found in the Arbeitsgemeinschaft Chemische Verfahrenstechnik: Im Dienste der chemisches Industrie, Köln, page 28.

The trays functioning with air-water system are observed visually in the checking apparatus and the observations too are evaluated empirically only.

Similar checking apparatus is described by R. Billet (Industrielle Destillation, Verlag Chemie GmbH, Weinheim, Bergstr. 1975, page 178–181), with the difference that the diameter of the tray of this checking apparatus is only 1.67 m, while the former apparatus is suitable for the observation of trays having substantially larger diameter. However the apparatus described in the book R. Billet can be operated not only with air-water system, but with other non-corrosive gases and hydrocarbon liquids as well. Assertion of the visual observations obtained in this checking apparatus for trays of larger diameter represents further, similarly empirical task.

As known, relationships for calculation of the efficiency of bubble-trays, or columns with bubble-trays used for distillation of two-component mixtures were developed with extensive research work during the 1950's. The result of this research work was published by the American Institute Of Chemical Engineers: Bubble-Tray Design Manual (The Science Press. Inc. New-York, 1958). Since then, however, the generalization of these relationships became questionable. Morever those overestimates too have become known to be consequences of using the method (P. K. Lashmet- S. Z. Szezepanski: Ind. Eng. Chem. Proc. Design and Dev. 13, 2.1974. 103–106). The extent of this overestimation in case of columns with relatively few trays is 28% in average, while in case of columns with many trays it is 7% in average.

The visual observations conducted with air-water system offer the opportunity for the elimination of flagrant constructional faults (e.g. dead spots, small statical liquid seal, or weir height) and thereby for new construction of the tray. Naturally this latter one too is submitted to the usual checking with air-water system.

If the designed column consists of trays the geometrical dimensions of which are not identical, then the pressure drop and capacity measurements with air-water system, as well as the visual observations are conducted for all trays characteristic to the column section and—if necessary—the mentioned constructional modifications have to be realized.

Evaluation of the visual observations conducted with air-water system as mentioned in points f. and g. is based on the fact, that if the elements (e.g. bubble caps, valves or tray holes etc.) arranged on a tray function uniformly and the runoff weir too is covered with liquid of uniform height, furthermore no significant dead spots are visible on the tray, then its efficiency in the chemical and petrochemical industries (R. Billet: Industrielle Destillation, Verlag Chemie GmbH, Weinheim, Bergstr. 1973. page 319) may vary between the following values:
ethylalcohol-water: 0.6–0.8
other organic mixture: 0.5–0.6
Dividing the predetermined theoretical tray number with these values, the actual tray number of the column is obtained.

An object of the present invention is a process and apparatus for the exact determination of the tray number of distillation and/or absorption columns without the need to provide for safety factor, whereby the unnecessary overestimation of the tray number is avoided. In this way the total investment and operating cost of the distillation and/or absorption units (aggregate) can be reduced, while the safe operation is invariably maintained.

The invention is based primarily on the recognition, that any set of trays may be regarded as a so-called mixer cascade consisting of seriesconnected mixers (the residence time-spectrum of fluids in such containers has been studied by P. Grasemann: Physikalische Grundlagen der Chemie-Ingenieur Technik, pp. 494–499, Verlag H. R. Sauerlander & Co. Aarau und Frankfurt/M 1961, and M. Zogg: Technische Rundschau 44, Nov. 1, 1977, pp. 3–5) the liquid content of which is mixed by vapour, gas or in this case by air conducted upwards. Accordingly, if the residence time-spectrum of a nonvolatile, water-soluble substance (tracer) is measured on the trays after it has been admitted into water conducted into the upper, or in given case into the intermediate tray of the set of trays used for determination of the actual tray number of distillation and/or absorption columns and on the basis of this the efficiency valid for the air-water system is calculated. Then the actual tray number of the distillation and/or absorption column valid for the mixture to be separated can be accurately calculated according to the known method (Bakowski: Chem. Eng. Sci. 1, 1957 page 266 and J. P. Walter and T. K. Sherwood: ind. Eng. Chem. 33, 1941, page 493) instead of the estimation used so far, as a result of which oversizing of the distillation and/or absorption units (aggregate) becomes unnecessary.

Furthermore the invention is based on the recognition, that the apparatus necessary for determination of the actual tray number of the columns of distillation and/or absorption units is built up with conventional units selected to be suitable for the purpose, such as apparatuses, structures, measuring instruments, tanks, pumps and computer necessary for the evaluation, which in the field of determining the actual tray number have already been in use separately, but as a result of their specific interconnection and joint application were not united in a single technological line for accurate determination of the actual tray number of the column without safety factor (e.g. feeder-storage tank, containing the water-soluble substance, furthermore measuring instrument, control electrodes and set of trays, etc necessary for determining the residence time-spectrum).

Accordingly, the invention is a process for a preliminary determination of the efficiency of trays of identical geometry and/or load in distillation and/or absorption column, in order to establish the actual number of trays in columns of given theoretical number of trays, wherein liquid is admitted from above and vapour or gas from underneath into an apparatus consisting of at least three trays of identical geometry, or of at least two trays of identical geometry and at least one gas or vapour distributor, and the efficiency of one or several trays is determined by operation of the testing apparatus in such a way that the preliminary determination is realized by measuring the residence time-spectrum of the admitted liquid on at least one tray of the set of trays.

For measuring the residence time-spectrum of admitted liquid, tracer is fed in by way of impulses wich may be either a non-volatile radioactive agent soluble in liquid, or electrolyte, or colouring agent, following by measuring the concentration of the tracer, or one of its physical-chemical characteristics in linear proportion with the concentration at least in the outflowing liquid at fixed intervals. Instead of the tracer fed into the admitted liquid, tracer solution too may be used for measuring the residence time-spectrum, which is either a non-volatile radioactive agent, when the liquid stream conducted into the set of trays is changed to the tracer solution, as a result of which—instead of the liquid admitted in advance into the set of trays, tracer solution is admitted, and then the concentration of the tracer present in the tracer solution, or the physical-chemical characteristic value dependent on the concentration is measured in the outflowing liquid at fixed intervals. The residence time-spectrum according to both processes is the measured concentration value, or the function in time of the characteristic value dependent on the concentration.

The liquid, or tracer solution is conducted according to the process in the upper, or in given case to the intermediate tray of the set of trays consisting at least of three trays of identical geometry or at least two trays of identical geometry as well as gas or vapour distributor, then the efficiency of the tested trays valid for the applied gas-liquid or vapour liquid system is calculated from the measured residence time-spectrum and the actual tray number of the distillation and/or absorption column consisting of trays of identical geometry or identical load is determined according to the known method.

In case of a distillation and/or absorption column which consists of sections with different geometry or load, the process is repeated for each section, followed by adding up the actual tray numbers calculated for each column section.

Preferably an air-water system is used for carrying out the process of this invention.

The invention relates to an apparatus as well, which has a set of trays consisting at least of three trays of identical geometry, or at least two trays and one air distributor connected with water intake pipe provided with volumeter, furthermore it has a tank receiving the set of trays connected with air supply source through the volumeter and provided with drain pipe and instrument for measuring the differential pressure, while the water intake pipe is connected with the pipe of the tracer, or tracer solution and the set of trays is provided with electrodes, or samplers connected with the measuring instrument.

Furthermore, this invention concerns any distillation and/or absorption column, the actual tray number of which is:

$$N_{eff} = N_{th}\left(1 - \frac{\Delta t_m}{\Delta t}\right) n_{eff}$$

where:
$N_{th}$ = theoretical tray number of the column
$n_{eff}$ = actual tray number of given set of trays
$\Delta t$ = difference of the mean value of the residence time-spectrums measured in water flowing down from the lower tray and conducted to the upper tray of the set of trays
$\Delta t_m$ = difference of the maximum spots of the residence time-spectrums measured in water flowing down from the lower tray and conducted to the upper tray of the set of trays.

The mean value of the residence time-spectrum means the length of time lapsed between admission of the tracer by way of impulses into the water conducted to the upper tray and half of the residence time lapsed between the first appearance of the tracer at the spot of measurement and disappearance of the tracer at the spot of measurement. Accordingly the spot of maximum residence time-spectrum means the time lapsed between admission of the tracer by way of impulses into the water conducted to the upper tray and the point of time when the maximum value of the tracer concentration or the maximum of the characteristic value dependent on the concentration is measured at the spot of measurement.

Advantages of the invention are the following:

1. Exact determination of the actual tray number (without safety factor) of the distillation and/or absorption columns based on the theoretical tray number instead of the efficiency estimation was successfully realized for the first time with the aid of the invention. Consequently, the efficiency fluctuations occurred until now can be eliminated by the scientifically supported evaluation, which means, that
in case of ethylalcohol-water the increased efficiency is 33%
in case of other mixture: 20%
thus the mean value of the increased efficiency is 25%, and for this reason saving of the tray number is 25% on a single occasion.

2. If a column with relatively small number of trays (e.g. 40) is selected to obtain 25% saving—though many more are used in the chemical and petrochemical industry—then the efficiency attained with the invention renders the use of 10 trays unnecessary.

3. In case of column with large number of trays, the saving for the totality of the distillation unit is 7%.

4. The average saving attainable by the exact determination of the efficiency of the trays according to the invention—against the present state—applies for each column system.

5. The saving demonstrated for each column system will effect the reduction of the total investment cost of the whole distillation unit (aggregate). The total investment saving depends primarily on the reduction of the tray number, diameter of the column and its structural material (R. F. Sommerville: Chem. Eng. 71–76, 1972). As a result of the reduced energy-input, the operating cost too will become less.

6. The apparatuses known so far for the visual observations and pressure drop measurements carried out with airwater system may be applied with the process according to the invention, only their complement with the requisits of the tracer technique is necessary.

7. Thus, instead of the distillation mixture, the inexpensive, easily accessible and safe air-water system can be used for determining the distillation efficiency of the trays.

The invention is described in detail with the aid of the enclosed drawings wherein FIG. 1 shows the flow diagram of a preferred construction of the apparatus used for the realization of the impulse technique with process alternative a. and FIG. 2 for realization of the displacement technique with process alternative b.

Figure 1:
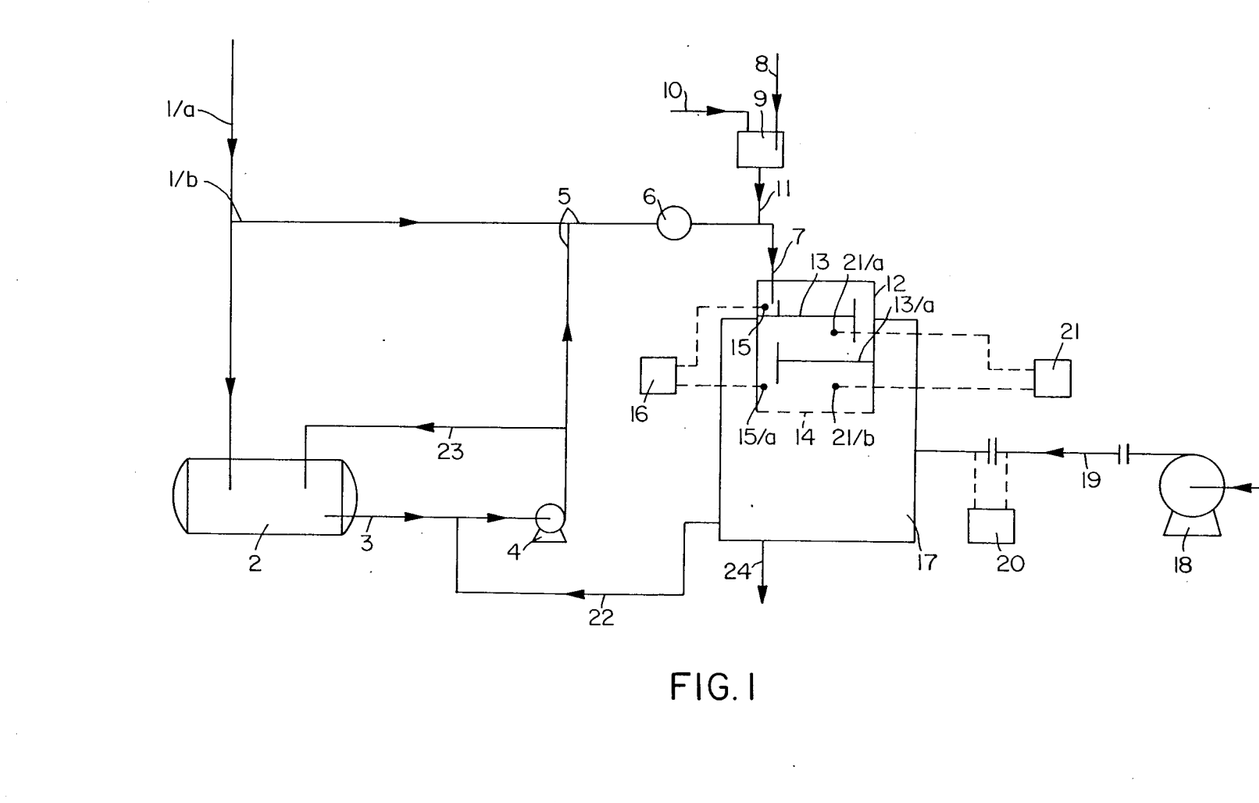
Figure 2:
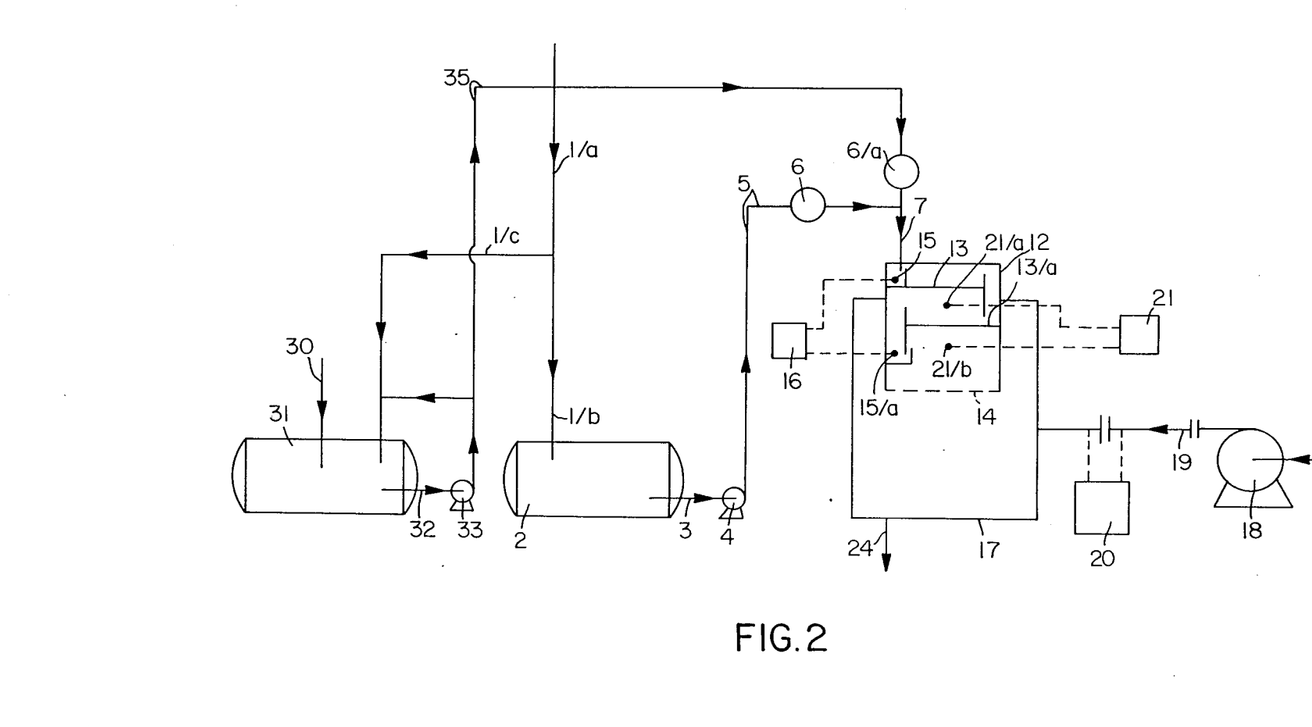

FIGS. 1 and 2 show the arrows marked on the inlet and outlet pipes interconnecting the units of the apparatus, indicating the flow of material, whereby the process taking place in the apparatus is clearly visible.

Before giving a detailed description of the apparatuses, it is to be understood that they may include conventional valves, venting ducts or other fittings, etc. positioned at the necessary points in the construction and in the appropriate numbers which in the interest of lucidity are not shown in the diagrams, their place and purpose are obvious for the expert. The part-elements, accessories, pipes etc. and their position in relation to each other are not shown to scale in the diagrams, however they give full information for the experts for realization of the apparatuses according to the invention.

The process alternatives a. and b. according to the invention are realized in the apparatus shown in FIGS. 1 and 2.

The apparatus is provided with a set of trays 12 which consists at least of three trays 13, 13b, or at least two trays 13 and 13a and one air distributor 14. Liquid intake pipe 7 is connected to the uppr tray 13 of the set of trays 12. The set of trays 12 is arranged in tank 17 interconnected with air delivery apparatus 18 through pipe 19 and volumeter 20. Tank 17 is provided with discharge pipe 24, and in case of process alternative a. with drain pipe 22. The sensors 15 and 15a for measuring the concentration and in given case for measuring the physical-chemical constants dependent on the concentration, or samplers and pressure testing pipes 21a–21b are arranged in the upper tray 13 and lower tray 13a of the set of trays 12; the latter ones are connected with differential pressure testing instrument 21.

Pipe 7 is connected to the tracer feeder 9 through pipe 11. The tracer feeder 9 is provided with tracer filling pipe 8 and compressed air or rare gas pipe 10.

Liquid storage tank 2 of the apparatus used for the impulse technique shown in FIG. 1 is connected to water filling pipe 1a, the suction pipe 3 is connected through delivery pump 4, pressure pipe 5, and liquid meter 6 to the said pipe 7. The water pipe 1b is leading into the pressure pipe 5.

Said drain pipe 22 is connected to the suction pipe 3. The pressure pipe 5 of the delivery pump 4 is interconnected with tank 2 through the circulation pipe 23.

Units 1–7 and 12–21, as well as 24 of the apparatus for displacement technique shown in FIG. 2 are the same as those used for realization of the impulse technique. In addition to these, the following units are used the displacement technique:

Tank 31 provided with tracer pipe 30 and water filling pipe 1c is connected through suction pipe 32 with pump 33. This is provided with circulation pipe 34, while its pressure pipe 35 is connected through liquid meter 6a to the said intake pipe 7.

The residence time-spectrum is determined with the apparatus by use of the impulse technique as follows:

Tank 2 is filled with water through water filling pipe 1a. The water is delivered with pump 4 through suction pipe 3, pressure pipe 5 and intake stub 7 into the set of trays 12, while the amount of water is measured with liquid meter 6. The water is conducted into the upper tray 13 of the set of trays 12, from where it flows onto tray 13a arranged beneath, then onto the lower tray of the set of trays 12, in this case through air distributor 14 into tank 17.

In case of testing the trays with light liquid load, the water conducted into the set of trays 12 passes through water filling pipes 1a and 1b directly to the set of trays 12, thus by cutting out the liquid storage tank 2, suction pipe 3 and pump 4. By starting the air delivery apparatus 18, the air pressed through pipe 19 similarly into tank 17, then passing through the air distributor 14, trays 13a and 13 it leaves the set of trays 12 and passes out into the open. The amount of air conducted through tank 17 into the set of trays 12 is measured by volumeter 20 built into the pipe 19. Upon conducting the amount of water flowing through the manually adjustable liquid meter 6, the amount of air flowing through the similarly manually adjustable volumeter 20 into the set of trays 12 as described earlier, the pressure drop occurring in the air stream is measured at least three times in a succession on the intermediate tray, in this case on tray 13a of the set of trays 12 with the aid of the differential pressure testing instrument 21, which is connected with stubs 21a and 21b to the set of trays 12. If the pressure drop measured at least three times in a succession shows constant value—in case of invariable water and air volume—then by sudden admission of compressed air or rare gas under pressure into feeder 9, given amount of tracer admitted by way of impulse through pipe 11—which was filled previously through pipe 8 into the feeder 9—is fed through pipe 7 into the upper tray 13 of the set of trays 12.

With the aid of instrument 16—connected with sensors 15 and 15a reaching into the liquid conducted to the upper tray of the set of trays at suitable, occasionally at uniform intervals calculated from the admission of the tracer, as well as flowing down from the lower tray of the set of trays or conducted to a tray of the set of trays and at the same time flowing down from the tray—a characteristic physical-chemical value of the liquid in proportion with the concentration of the tracer is measured at a given point of time (e.g. pH value, conductivity, etc.).

The sensor 15 shown in FIG. 1 reaches into the liquid flowing into the upper tray 13 of the set of trays 12, while sensor 15a into the liquid flowing down from tray 13a.

In given case the physical-chemical characteristic of the samples taken from the liquid, for instance of trays 13 and tray 13a—instead of sensors 15 and 15a—through identically marked sampler pipes, can be examined by other method too (e.g. by titration).

Some kind of radioactive material, or electrolyte, or colouring agent may be used for tracer. The sensors 15 and 15a, as well as measuring instrument 16 are adapted to the applied tracer in respect of their measuring principle.

The water and tracer admitted through pipe 7 are collected in tank 17. Upon completion of the measuring sequence this diluted tracer is conducted through drain pipe 22 with pump 4, through the circulation pipe 23 into tank 2, where it is available for further measurements. With the aid of the circulation pipe 23 branching off pressure pipe 5 and returning into the liquid storage tank 2, this liquid can be turned over and homogenized. If no measurement is performed over a long period, the liquid collected, occasionally retained in tank 17 is subjected to suitable water treatment through discharge pipe 24.

The next measurement is carried out in such a way, that more water than used in the previous measurement, in given case diluted tracer-solution and air measured on liquid meter and volumeter 20 are set in so that the quotient of the streams ($m^3$/h) of the amount of air and water equal to the one set in in the first measuring sequence. Thereafter the process is the same as before. Each measuring sequence can be carried out suitably with 5 different amounts of air water.

The differences of the values at identical points of time measured with samples taken from the sampler pipes 15 and 15a with sensors 15 and 15a, and instrument 16, are graphically illustrated in function of the measured intervals. This way the residence time-spectrum was produced.

Determination of the residence time-spectrum with displacement technique using the apparatus according to FIG. 2 is the following:

Tank 2 is filled with water through the water filling pipe 1a. Pump 4 delivers the water through suction 3, pressure pipe 5 and intake pipes 7 into the set of trays 12, while the amount of water is measured with liquid meter 6. The water is conducted into the upper tray 13 of the set of trays 12, from where it flows onto the next tray 13a, then to the lower tray of the set of trays 12, in this case through the air distributor 14 into tank 17.

When trays of light liquid load are tested, the water conducted into the set of trays 12 passes through water filling pipes 1a and 1b directly into the set of trays 12, thus by cutting out the tank 2, suction pipe 3 and pump 4.

Upon starting the air delivery apparatus 18, the air is pressed through pipe 19 similarly into tank 17, from where passing through trays 13a and 13 it leaves the set of trays 12 and passes into the open. The amount of air conducted through tank 17 into the set of trays 12 is measured by volumeter 20 built into the set of trays 12 is measured by volumeter 20 build into pipe 19.

Prior to measuring the tray to be tested, tracer of given quantity is filled through pipe 30 into the tank 31, then it is diluted with water flowing through water pipes 1a and 1c. The so-prepared diluted tracer solution is homogenized with pump 33, which pumps the solution through suction pipe 32 and returns the solution through circulation pipe 34 into tank 31.

When the amount of water flowing through the manually adjustable liquid meter 6 is regulated, then the amount of air flowing through the manually adjustable volumeter 20 are conducted into the set of trays as described above, then the pressure drop in the air stream is measured at least three times in a succession on the intermediate, in this case on tray 13a of the set of trays with the aid of the differential pressure measuring instrument 21, which is connected to the set of trays with pipes 21a and 21b. If the pressure drop measured at least three times in a succession remains at constant value in case of invariable amount of water and air, then the characteristic physical-chemical value (e.g. pH, or conductivity, etc.) of the admitted water is measured at uniform intervals with instrument 16 connected with sensor 15a immersed into the liquid flowing down from tray 13a. In given case the physical-chemical characteristic of the sample taken from the liquid of tray 13a through the sampler pipe 15a—instead of sensor 15a—can be tested by other method as well (e.g. by titration). This is followed by starting the pump 33 simultaneously with stopping of pump 4 and shutting off respective apparatuses, which by opening of the corresponding fittings carries the homogenized tracer solution through pressure pipe 35, liquid meter 6a and pipe 7 to the upper tray 13 of the set of trays. The amount of liquid flowing in the pressure pipe 35 is to be set with the corresponding shut-off fittings in such a way, that the liquid meter 6a indicates the same value as the water meter 6 during operation of the set of trays with water.

Thereafter, the physical-chemical characteristic value of the tracer solution is measured with the aid of sensor 15a and instrument 16, or by analysis of the samle taken through sampler pipe 15a.

The water and tracer solution admitted through pipe 7 are collected in tank 17. Upon completion of each measuring sequence, the diluted tracer solution is subjected to waste water treatment through discharge pipe 24.

The next measurement is conducted by setting in larger quantities than before, measured on the water meter 6 and volumeter 20 in such a way, that the quotient (m³/h) of the amount of air and water equals the quotient set in the first measuring sequence. Hereinafter the process is the same as before. Each measuring sequence is carried out suitably with 5 different amounts of air and water.

Due to the nature of the displacement technique, the characteristic physical-chemical value—determined by analysis of the water conducted to the set of trays 12 followed by analysis of the liquid taken out occasionally through sampler pipe 15 measurable with sensor 15 and instrument 16 arranged on any tray of the set of trays upon admission of the tracer solution—will indicate only qualitatively the above described change-over from water to tracer solution. The sensor 15 in FIG. 2 reaches into the liquid conducted to the upper tray 13 of the set of trays. On the other hand, the characteristic physical-chemical value of the liquid-flowing down from the lower tray of the set of trays 12—in this case from tray 13a—is measured continuously, at uniform intervals by sensor 15a and instrument 16 during operation with water and upon the mentioned change-over to tracer solution. In given case, by analysis of the water taken through sampler pipe 15a, then upon change-over by analysis of the tracer solution, the characteristic physical-chemical value of the water, then that of the tracer solution can be measured. The values obtained by analysis of the water and tracer solution samples measured with sensor 15a and instrument 16, or taken out through sampler pipe 15a are graphically illustrated in function of the measured intervals. This way, again, the residence time-spectrum is obtained.

EXAMPLE

A column was built for the purpose of atmospheric distillation. The theoretical tray numbers were
in the rectifying section: $(N_{th})_1 = 15$,
in the stripping section: $(N_{th})_2 = 12$,
total: $(N_{th}) = (N_{th})_1 + (N_{th})_2 = 15 + 12 = 27$ The calculated vapour and liquid streams in the different column sections are the following:
in the rectifying section:
  $(V_D)_1 = 1.317 \times 10^3$ m³/h
  $(V_F)_1 = 2.2195$ m³/h
in the stripping section:
  $(V_D)_2 = 1.493 \times 10^3$ m³/h
  $(V_F)_2 = 4.256$ m³/h
Further data taken as basis for each column section are the following:
in the rectifying section:
  temperature: $T_1 = 359$ $K_1$
  mole mass: $M_1 = 41.6$ kg/mole
in the stripping section:
  temperature: $T_2 = 379$ $K_1$
  mole mass: $M_2 = 19.5$ kg/mole Based on the preliminary examinations, identical bubble trays were selected for both column sections, the diameter of which is 750 mm. 18 bubble caps were arranged on each tray (diameter of bubbles 90 mm). Details of the selected bubble-tray are found in the literature (E. Kirschbaum: Chemie. Ing. Techn. 26, 1954. No. 8/9. page 461.)

According to the calculations, the gaps of all bubble caps will become fully open in both column sections under the effect of vapour.

In order to measure the efficiency of the selected bubble-tray with air-water system, a set of trays consisting of
$n_{eff} = 3$
trays were hydraulically tested in a testing apparatus.

In order to determine the actual tray number of the rectifying section, the trays were tested with
$1.317 \times 10^3$ m³/h air stream, and
$2.195$ m³/h water stream An aqueous solution of NaCl (20%) was admitted by way of impulse into the water stream conducted to the set of trays. The electric conductivity of salt dissolved in water was measured at fixed intervals. The measured data give the residence time-spectrum shown in conductivity vs. time co-ordinate system. The following values were obtained from the residence time-spectrums which were taken in the liquid flowing down from the lower tray, and in water conducted to the upper tray:

$(\Delta t)_1 = 169$ s and $(\Delta t_m) = 94$ s where $\Delta t$ = difference of the mean values of the residence time-spectrums measured in water flowing down from the lower tray and conducted to the upper tray, $\Delta t_m$ = difference of the maximum spots of the residence time-spectrums measured as before The actual tray number of the rectifying section calculated for air-water system is the following:

$$(N_{eff})_1 = \frac{(N_{th})_1}{(\eta)_1} = (N_{th})_1 \frac{(n_{eff})_1}{(n_{eff})_1} =$$

$$(N_{th})_1 \left(1 - \frac{t_m}{t}\right) (n_{eff}) = 15 \left(1 - \frac{94}{169}\right)^3 = 20$$

where
$N_{eff}$ = actual tray number of a column or column section
$N_{th}$ = theoretical tray number of a set of trays
$\eta$ = efficiency of the set of trays
(K. Pippel: Chemische Technik, 17, 1965 No. 12. page 729–738)

For determining the actual tray number of the stripping section, a set of trays identical with the previous one was used into which
$1.495 \times 10^3$ m³/h air and
4.256 m³/h water
were admitted. Thus the efficiency of the set of trays now was determined for a heavier load than used in the rectifying section, but otherwise according to the same method.

From the plotted residence time-spectrums the following can be obtained:
$(\Delta t)_2 = 149$ s and $(\Delta t_m)_2 = 79$ s
The actual tray number of the stripping section, for the air-water system is given as:

$$(N_{eff})_2 = 12 \left(1 - \frac{79}{149}\right) 5 = 16.91 \ 17$$

The actual tray number (without safety factor) of the whole column will be:

$$N_{eff} = (N_{eff})_1 + (N_{eff})_2 = 20 + 17 = 37$$

In view of above, the average tray efficiency valid for the air-water system would be:
in the rectifying section: $/\eta/_1 = 15/20 = 0.750$
in the stripping section: $/\eta/_2 = 12/17 = 0.706$ The efficiencies for the air-water system were calculated for the mixture to be separated with the method of Bakowsky (Chem. Eng. Sci. 1, 1957, page 266). The following data are still necessary for the recalculation:
mole mass of air: 29 kg/mole
mean temperature of air: 293 K.

Due to the fully open gaps, the recalculation method was used in the following form:
in the rectifying section:

$$10 \text{ g} \frac{1}{1 - (\eta)_1} = 10 \text{ g} \frac{1}{1 - 0.750} (359)^{0.5} \left(\frac{41.6}{29}\right)^{0.5}$$

in the stripping section:

$$10 \text{ g} \frac{1}{1 - (\eta)_2} = 10 \text{ g} \frac{1}{1 - 0.706} \left(\frac{293}{370}\right)^{0.5} \left(\frac{19.5}{29}\right)^{0.5}$$

End result of recalculation in the rectifying section:

$$\eta_1 = 0.777 \text{ and } /N_{eff}/_1 = \frac{1}{0.777} \sim 20$$

in the stripping section:

$$\eta_1 = 0.59 \text{ and } /N_{eff}/_2 = \frac{12}{0.59} \sim 21$$

Thus in case of mixture to be separated, the actual tray number (without safety factor) for the whole column is:

$$N_{eff} = 20 + 21 = 41$$

The invention leads to a final result based on measurements and requires simple calculation work only, as proved by the demonstrated example for the two column sections.

In case of using displacement technique, the concentration or variation of the characteristic value in time dependent on the concentration shows a so-called transitional function. Since a relationship exists between the transitional function and residence spectrum, the transitional function can be converted to residence time-spectrum. Thereafter the procedure is according to the example.

What I claim is:

1. A process for the determination of the efficiency of trays of essentially same geometry and/or load in distillation columns of given theoretical tray numbers and establishing the actual number of trays needed, which comprises:
    (a) providing a test apparatus having a set of at least two distillation trays having upper and lower trays of essentially the same geometry and a distillation tray for distributing vapor or gas positioned below said lower tray;
    (b) introducing a test liquid into said upper tray of said test apparatus;
    (c) introducing a gas or vapor into the bottom of said test apparatus whereby said gas or vapor passes through the distillation tray distributing said gas or vapor and upwardly through said descending test liquid;
    (d) measuring the residence time spectrum of test liquid introduced into at least one of said trays of said set of trays;
    (e) calculating the efficiency of said trays from said measured residence time spectrum; and
    (f) determining the actual number of trays needed for said column from said calculated efficiency.

2. A process according to claim 1 in which said vapor or gas distributing distillation tray has essentially the same geometry as the other trays provided in the test apparatus.

3. A process according to claim 1 in which said vapor or gas is introduced into the bottom of said test apparatus through a perforated plate positioned below said lower tray.

4. A process according to claim 1 in which the residence time of said test liquid is determined by introducing a tracer into said liquid by impulse and then measuring the concentration of said tracer, or a physical-chemical characteristic linearly related to said concentration, at fixed time intervals.

5. A process according to claim 1 in which the residence time of said test liquid is determined by introducing a tracer soluton into said set of trays and then measuring the concentration of the tracer dissolved in said tracer solution or a physical-chemical characteristic linearly dependent on said concentration at fixed time intervals.

6. A process according to claims 1, wherein the test liquid is water and the vapor or gas is air.

7. An apparatus for the determination of the efficiency of a set of trays of a distillation column having essentially the same geometry and/or load of given theoretical tray number and establishing the actual number of trays needed comprising:
   (a) a tray set having at least two distillation trays and means for distributing a gas or vapor through said tray set, said tray set being provided with a water filling pipe having a liquid meter for measuring water to be introduced into said tray set;
   (b) said apparatus having a tank supplied with an air supply source incorporating an air flow meter, said tray set being positioned in said tank, said tank being provided with a tank discharge pipe and a differential air pressure measuring instrument;
   (c) said tray set having an intake pipe to which is connected a tracer solution pipe;
   (d) pump means for delivering tracer solution to said tracer solution pipe
   (e) said tray set also having means adapted for measuring the concentration of tracer in solution contained in at least one tray of said tray set or a physical or a physical-chemical characteristic linearly dependent on that concentration of said tracer;
   whereby the residence time spectrum for said tray set may be determined from which the efficiency of said trays and the actual number of trays required for said column can be calculated.

8. An apparatus according to claim 7 in which said means for distributing gas or vapor through said tray set is a distillation or absorption tray having essentially the same geometry as the trays of said tray set.

9. An apparatus according to claim 7 in which said means for distributing gas or vapor through said tray set comprises a perforated plate positioned below the lower tray.

10. An apparatus according to claim 7 wherein said tracer pipe is connected to said tray set intake pipe, the latter being interconnected with a tracer feeder through a tracer filling pipe.

11. An apparatus according to claim 10 in which a pressure pipe supplied with a compressed or rare gas is connected to said tracer feeder.

12. An apparatus according to claim 7 in which said tracer solution pipe is provided with a delivery pump and is connected to said tray set intake pipe, said delivery pump being connected to a tracer solution storage tank provided with tracer filling pipe.

13. An apparatus according to claim 12 in which the intake side of said delivery pump for delivery of tracer solution is connected through a suction pipe to said tracer solution storage tank; the delivery side of said delivery pump being connected with said tracer solution pipe, the latter being provided with a liquid meter connected to the tray set intake pipe, the delivery side of said delivery pump also being connected through a circulation pipe to said tracer solution storage tank.

14. A apparatus according to claims 12 or 13 in which said tracer solution storage tank is provided with a filling pipe.

15. An apparatus according to claims 7, in which a liquid storage tank provided with a water filling pipe or a tracer solution storage tank is connected to said tray set intake pipe.

16. An apparatus according to claims 7, in which the liquid storage tank or the tracer solution tank is connected through a suction pipe, a delivery pump, a pressure pipe and a liquid meter to the intake pipe of said tray set.

17. A process for the determination of the efficiency of trays of essentially the same geometry and/or load in absorption columns of given theoretical trays numbers and establishing the actual number of trays needed in said column which comprises:
   (a) providing a test apparatus having a set of at lest two absorption trays having upper and lower trays of essentially the same geometry and an absorption tray for distributing a vapor or gas positioned below said lower tray;
   (b) introducing a test liquid into said upper tray of said test apparatus;
   (c) introducing a gas or vapor into the bottom of said test apparatus whereby said gas or vapor passes through the absorption tray distributing said gas or vapor and upwardly through said descending test liquid;
   (d) measuring the residence time spectrum of test liquid introduced into at least one of said trays of said set of trays;
   (e) calculating the efficiency of said trays from said measured residence time spectrum; and
   (f) determining the actual number of trays needed from said calculated efficiency.

18. An apparatus for the determination of the efficiency of a set of trays of an absorption column having essentially the same geometry and/or load of given theoretical tray number and establishing the actual number of trays needed comprising:
   (a) a tray set having at least two absorption trays and means for distributing a gas or vapor through said tray set, said tray set being provided with a water filling pipe having a liquid meter for measuring water to be introduced into said tray set;
   (b) said apparatus having a tank supplied with an air supply source incorporating an air flow meter, said tray set being positioned in said tank, said tank being provided with a tank discharge pipe and a differential air pressure measuring instrument;
   (c) said tray set having an intake pipe to which is connected a tracer solution pipe;
   (d) pump means for delivering tracer solution to said tracer solution pipe;
   (e) said tray set also having means adapted for measuring the concentration of tracer in solution contained in at least one tray of said tray set or a physical-chemical characteristic linearly dependent on the concentration of said tracer;
   whereby the residence time spectrum for said tray set may be determined from which the efficiency of said trays and the actual number of trays required for said column can be calculated.

19. A process according to claims 1 or 17 wherein the actual tray number for the columns are calculated from the following mathematical relationship:

$$N_{\textit{eff}} = N_{th}\left(1 - \frac{\Delta t_m}{\Delta t}\right) n_{\textit{eff}}$$

where $N_{\textit{eff}}$=actual tray number for said columns;

$N_{th}$=theoretical tray number of the column;

$n_{\textit{eff}}$=actual tray number of said set of trays;

$\Delta t$=difference of the mean values of the residence time spectrums measured in water flowing down from the lower tray and conducted to the upper tray; and $\Delta t_m$=difference of the maximum spots of the residence time spectrums measured in water flowing down from the lower tray and conducted to the upper tray.

* * * * *